United States Patent
Singer et al.

(10) Patent No.: US 8,050,623 B2
(45) Date of Patent: Nov. 1, 2011

(54) METHOD AND DEVICE FOR PROMOTION AND SALE OF MEDIA FILES ON AD HOC MOBILE DEVICE NETWORKS

(75) Inventors: Howard Singer, Morganville, NJ (US); Laird Popkin, New York, NY (US); Yariv Sadan, Tenafly, NJ (US)

(73) Assignee: Time Warner, Inc., New York, NY (US)

( * ) Notice: Subject to any disclaimer, the term of this patent is extended or adjusted under 35 U.S.C. 154(b) by 820 days.

(21) Appl. No.: 11/002,737

(22) Filed: Dec. 2, 2004

(65) Prior Publication Data

US 2006/0039304 A1    Feb. 23, 2006

Related U.S. Application Data

(63) Continuation-in-part of application No. 10/922,243, filed on Aug. 18, 2004, now Pat. No. 7,860,923.

(51) Int. Cl.
*H04B 7/00* (2006.01)

(52) U.S. Cl. ........ 455/41.2; 455/517; 455/518; 709/204

(58) Field of Classification Search .................. 370/310; 707/1, 10; 455/41.2, 518–519, 517; 709/204–207; 705/26
See application file for complete search history.

(56) References Cited

U.S. PATENT DOCUMENTS

| | | | |
|---|---|---|---|
| 6,307,837 B1 | 10/2001 | Ichikawa | |
| 6,434,134 B1 | 8/2002 | La Porta et al. | |
| 6,502,194 B1 * | 12/2002 | Berman et al. | 726/28 |
| 6,678,252 B1 | 1/2004 | Cansever | |
| 6,744,740 B2 | 6/2004 | Chen | |
| 7,072,846 B1 * | 7/2006 | Robinson | 705/10 |
| 7,130,921 B2 | 10/2006 | Goodman et al. | |
| 7,143,102 B2 | 11/2006 | Fiennes et al. | |
| 7,466,823 B2 * | 12/2008 | Vestergaard et al. | 380/227 |
| 2002/0059144 A1 * | 5/2002 | Meffert et al. | 705/51 |
| 2002/0080888 A1 | 6/2002 | Shu et al. | |
| 2002/0138552 A1 | 9/2002 | DeBruine et al. | |
| 2003/0050966 A1 | 3/2003 | Dutta et al. | |
| 2003/0061137 A1 * | 3/2003 | Leung et al. | 705/35 |
| 2003/0069749 A1 | 4/2003 | Shear et al. | |
| 2003/0069921 A1 | 4/2003 | Lamming et al. | |
| 2003/0079133 A1 * | 4/2003 | Breiter et al. | 713/182 |
| 2003/0097449 A1 | 5/2003 | Derocher et al. | |
| 2003/0120817 A1 | 6/2003 | Ott et al. | |
| 2003/0202494 A1 | 10/2003 | Drews et al. | |

(Continued)

FOREIGN PATENT DOCUMENTS

WO    PCT/US05029574    3/2006

(Continued)

OTHER PUBLICATIONS

ISR for PCT/US05/29574, Mar. 22, 2006, Time Warner, Inc.

(Continued)

*Primary Examiner* — Raymond Dean
(74) *Attorney, Agent, or Firm* — Proskauer Rose LLP

(57) ABSTRACT

A method and apparatus for distributing a media content file wherein a file is received in a node. The received file is then shared with a recognized neighbor node. Once the file is provided by a distributor node to a neighbor node, the distributor node claims an incentive for sharing the file with the neighbor node.

18 Claims, 13 Drawing Sheets

U.S. PATENT DOCUMENTS

| | | | |
|---|---|---|---|
| 2004/0034601 A1 | 2/2004 | Kreuzer | |
| 2004/0122958 A1 | 6/2004 | Wardrop | |
| 2004/0199809 A1 | 10/2004 | Hanam et al. | |
| 2004/0203698 A1 | 10/2004 | Comp | |
| 2004/0260669 A1 | 12/2004 | Fernandez | |
| 2005/0131761 A1* | 6/2005 | Trika et al. | 705/14 |
| 2005/0160111 A1 | 7/2005 | Plastina et al. | |
| 2005/0165795 A1* | 7/2005 | Myka et al. | 707/100 |
| 2006/0008256 A1 | 1/2006 | Khedouri et al. | |
| 2006/0031558 A1 | 2/2006 | Ortega et al. | |
| 2006/0035713 A1 | 2/2006 | Cockerille et al. | |
| 2006/0039303 A1 | 2/2006 | Singer et al. | |
| 2006/0041561 A1 | 2/2006 | Singer et al. | |
| 2006/0041943 A1 | 2/2006 | Singer et al. | |
| 2006/0048187 A1 | 3/2006 | Lubbers et al. | |
| 2006/0146765 A1 | 7/2006 | Van De Sluis et al. | |
| 2006/0168318 A1 | 7/2006 | Twiss | |
| 2006/0208074 A1 | 9/2006 | Eglen et al. | |
| 2006/0242036 A1 | 10/2006 | Walker et al. | |
| 2007/0097885 A1 | 5/2007 | Traversat et al. | |
| 2007/0112676 A1 | 5/2007 | Kontio et al. | |
| 2009/0234914 A1* | 9/2009 | Mikkelsen et al. | 709/203 |

FOREIGN PATENT DOCUMENTS

| | | |
|---|---|---|
| WO | WO 2006/023733 A2 | 3/2006 |
| WO | WO 2006/023734 A2 | 3/2006 |
| WO | WO 2006/023836 A2 | 3/2006 |
| WO | WO 2006/023837 A2 | 3/2006 |

OTHER PUBLICATIONS

ISR for PCT/US05/29749, Apr. 11, 2006, Time Warner, Inc.

ISR for PCT/US05/29750, Jun. 29, 2006, Time Warner, Inc.

"Download Manager," article retrieved from Wikipedia encyclopedia Sep. 14, 2007 pp. 1-2.

"Kazaa," article retrieved from Wikipedia encyclopedia on Sep. 14, 2007, pp. 1-8.

ifipi GRid, "New Electronic Identifier Helps Develop Legitimate Online Music Market," Grid Standard: Grid Syntax Grid Handbook, pp. 1-5, retrieved from http://87.84.226.196/grid/index.html on Sep. 14, 2007.

"Napster Mobile Launched on AT&T Wireless" AT&T Wireless, Data, Nov. 3, 2004, 1 p.

"Pocket Rendezvous: Simple Pocket PC Networking," Jun. 2, 2004, 1 p.

"Segmented Downloading," article retrieved from Wikipedia encyclopedia on Sep. 14, 2007.

Liang, Jian et al., "Understanding KaZaA," Polytechnic University, Dept. of Computer and Information Science, May 6, 2004, pp. 1-7. Retrieved from http://cis.poly.edu/~ross/papers/UnderstandingKaZaA.pdf on Sep. 13, 2007.

Broida, Rick, "Zeosoft Turns Mobile Devices into App Servers," ZDNet Reviews Aug. 16, 2004.

* cited by examiner

METHOD AND DEVICE FOR PROMOTION AND SALE OF MEDIA FILES ON AD HOC MOBILE DEVICE NETWORKS

RELATED APPLICATIONS

The present application is a continuation-in-part of application Ser. No. 10/922,243 filed Aug. 18, 2004, now U.S. Pat. No. 7,860,923 by Singer entitled "Method and Apparatus for Wirelessly Sharing a File Using an Application-Level Connection," the priority date of which is hereby claimed.

BACKGROUND

Peer-to-peer networking has gained wide popularity as a means for sharing files. Peer-to-peer networking is especially popular in those instances when the shared files are media content files, for example audio content and video content files. Peer-to-peer networking is similar to a more traditional data sharing paradigm called the "client-server" model. In the client-server model, computers share information in a structured manner where one computer is a server and another computer is a client. Although the manner in which a data transfer takes place is different, peer-to-peer networking and client-sever transactions typically both rely on a ubiquitous computer data network, for example a local area network or a wide area network (e.g. the Internet). One distinguishing characteristic of the peer-to-peer model vis-à-vis the client-server model is that a computer operating in a peer-to-peer configuration is capable of acting both as a client and as a server, depending upon a particular data transaction. For example, when a computer in a peer-to-peer network needs data, that computer can operate as a client. The same computer can also provide data as a server when called upon to do so by another computer communicatively associated with the first computer in a peer-to-peer network.

Many mobile device are now equipped with one or more wireless data interfaces. A mobile device that includes a wireless interface can participate in an ad-hoc data network, which is typically a short lived communications channel that is established between devices that include a wireless interface. Such wireless ad-hoc networks often use peer-to-peer connections to facilitate sharing of media content files.

Because wireless ad-hoc networks are limited in time and space, it becomes difficult to enable reliable sharing of a file with a neighbor node. Furthermore, a user of a mobile wireless device may not want to share any files with a neighbor node because that user may want to reserve for other purposes the limited data bandwidth provided by a wireless connection. As a result, ad-hoc file sharing is only supported by users that actually want to share a file. To the detriment of copyright owners, most users of mobile wireless devices are only interested in sharing pirated media content files. As a consequence, most users are unwilling to participate in the distribution of a legitimate media content file using a wireless ad-hoc network.

SUMMARY

A method and apparatus for distributing a media content file wherein a file is received in a node. The received file is then shared with a recognized neighbor node. Once the file is provided by a distributor node to a neighbor node, the distributor node claims an incentive for sharing the file with the neighbor node.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
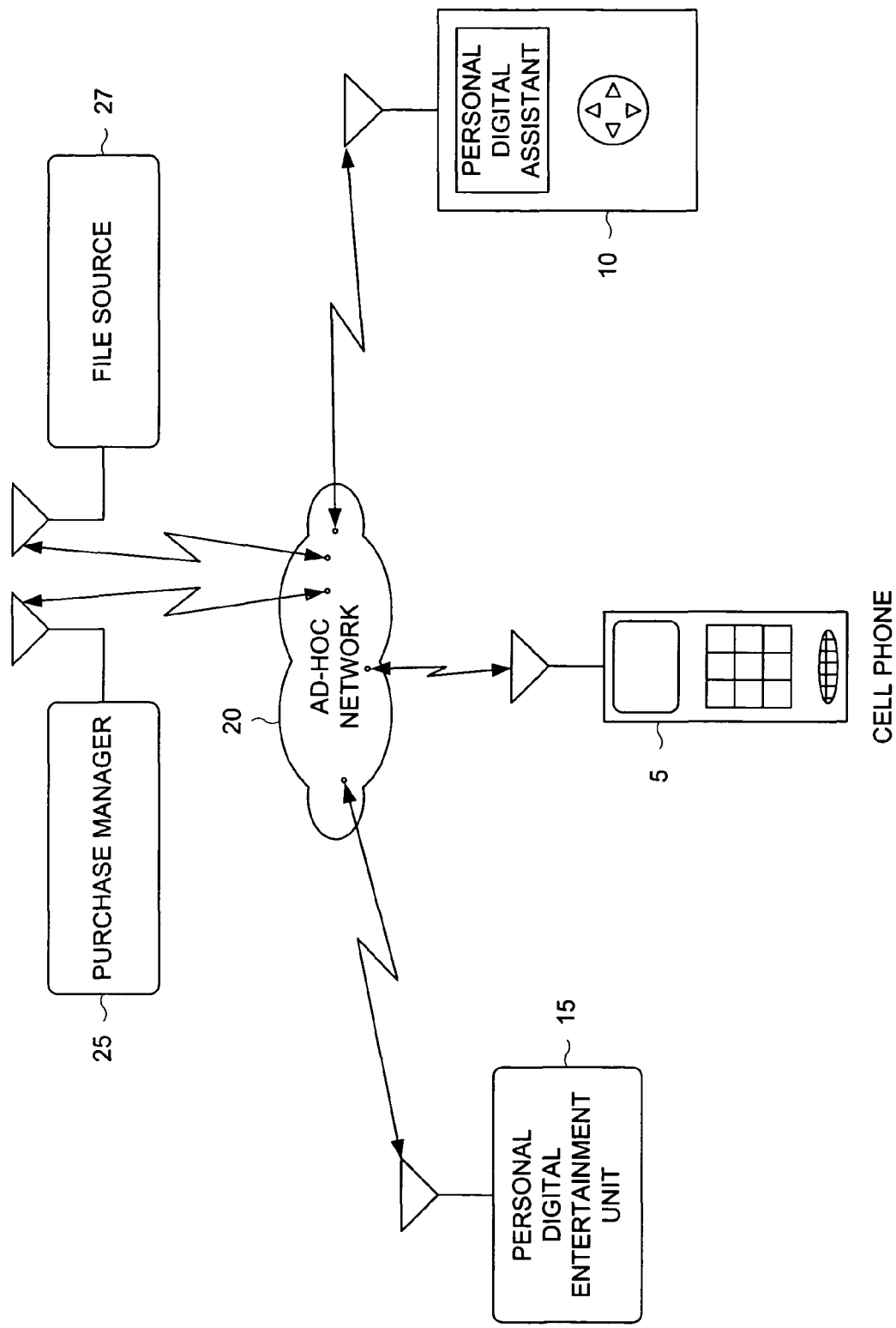
FIG. 1 is a pictorial representation that depicts one illustrative use case wherein the present method is utilized for ad hoc file sharing.

FIG. 1 is a pictorial representation that depicts one illustrative use case wherein the present method is utilized for promulgating a file. Today, there are a plethora of intelligent, wireless devices. These intelligent wireless devices include, but are not necessarily limited to personal digital entertainment units 15, cellular telephones 5 and personal digital assistants 10. Included in each of these example intelligent wireless device is a wireless interface enabling the intelligent wireless device to participate in an ad hoc network 20. It should be noted that there are many varied techniques for establishing an ad hoc network 20. From the perspective of this disclosure, an ad hoc network 20 comprises a network that is temporarily established between intelligent wireless devices. In a typical ad hoc networking environment, the ad hoc network is established when one intelligent wireless device perceives a second intelligent wireless device. The two intelligent wireless devices enable the communication of one or more data packets between processes executing in each of the intelligent wireless devices. Also shown in the figure is a purchase manager 25, the function of which is described infra. Additionally shown in the figure is a file source 27, the function of which is also described infra.

The physical structure of intelligent wireless device includes a wireless network interface. One form of a wireless network interface includes an 802.11 wireless networking interface. Another form of a wireless network interface includes a Blue-Tooth interface. Doubtless, continued evolution of intelligent wireless networking will yield yet other forms of wireless network interfaces. It should be noted that the present method can be applied in any wireless networking structure and is not dependent upon any particular form of a wireless network interface.

Figure 2:
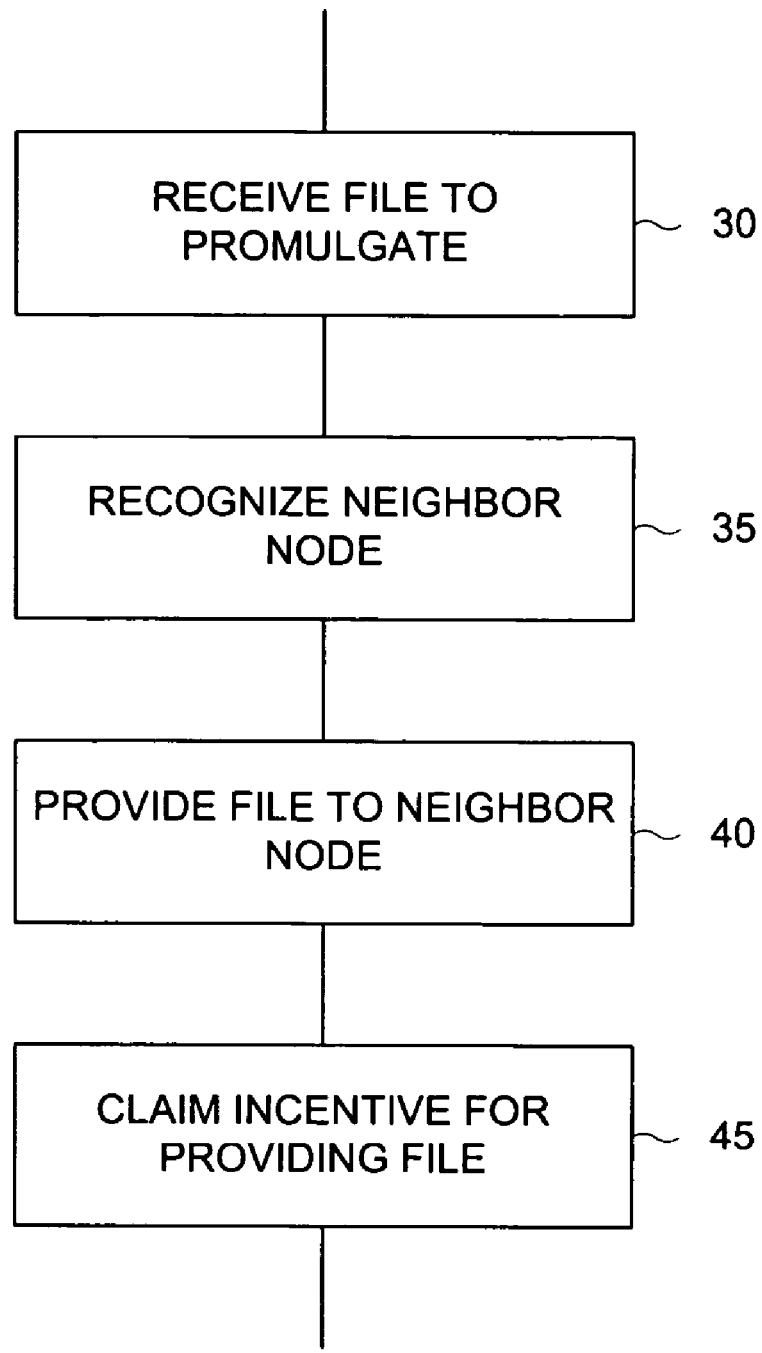
FIG. 2 is a flow diagram that depicts one example method for wireless electronic media file distribution.

FIG. 2 is a flow diagram that depicts one example method for wireless electronic media file distribution. According to this example method, a wireless electronic media file is distributed by first receiving a file that is to be promulgated (step 30). A neighbor node is then recognized (step 35). Once a neighbor node is recognized, the file is then provided to the neighbor node (step 40). An incentive is then claimed once the file is provided (step 45). It should be appreciated that the incentive is typically claimed for the act of providing a file to a neighbor node.

Figure 3:
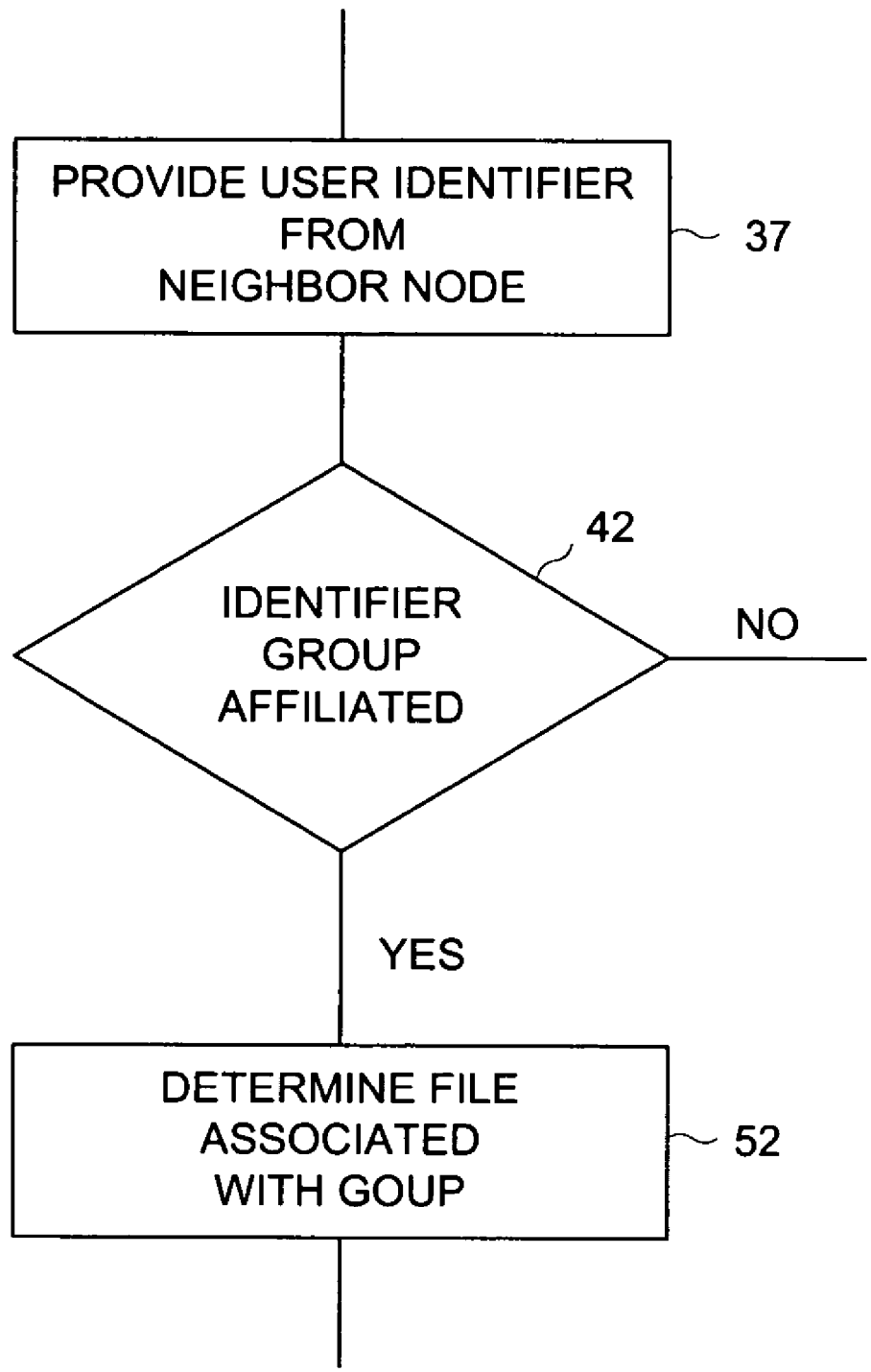
FIG. 3 is a flow diagram that depicts one alternative method for providing a file to a neighbor node.

FIG. 3 is a flow diagram that depicts one alternative method for providing a file to a neighbor node. According to this alternative example method, before a file is provided to a neighbor node (step 55), a determination is made as to whether or not the neighbor node is servicing an independent user (step 50). It should be appreciated that in order to properly claim an incentive for providing a file to a neighbor node, the neighbor node needs to belong to an independent user. An independent user is a user that is not affiliated with a group of other users which are distributing a media file according to the present method. It should be further appreciated that an independent user may gain status as a distributing user once the independent user has received a particular media file. Then, once an independent user receives a media file, the independent user can also provide the file to yet a second independent node. The independent user is said to become a new distributing user. Such a new distributing user can then claim an incentive according to the present method once the new distributing user provides the file to a second independent node. According to one variation of the present method, a neighbor node is determined to be an independent node when the neighbor node does not have stored therein the file that is to be promulgated according to the present method.

Figure 4:
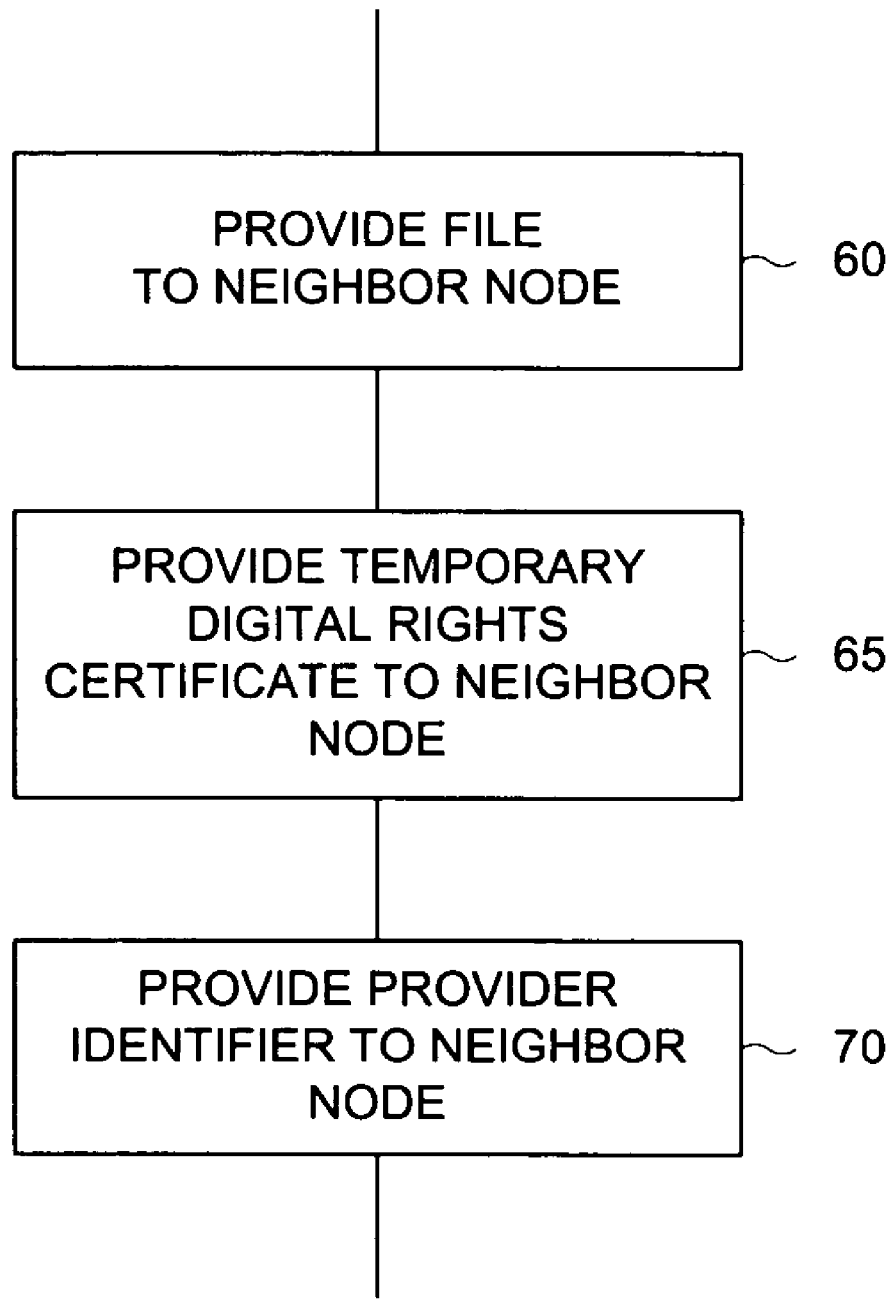
FIG. 4 is a flow diagram that depicts an alternative example method wherein a file is provided in conjunction with a temporary digital rights certificate.

FIG. 4 is a flow diagram that depicts an alternative example method wherein a file is provided in conjunction with a temporary digital rights certificate. According to this variation of the present method, a file is provided to a neighbor node by first providing the file to the neighbor node (step 60). In addition to the file, this variation of the present method provides that a temporary digital rights certificate is also conveyed to the neighbor node (step 65). Additionally, a provider identifier is also provided to the neighbor node (step 70). According to one illustrative use case, a neighbor node that receives a file and a temporary digital rights certificate according to this variation of the present method may only enjoy access to the file received from a distributing node according to the rights granted by the temporary digital rights certificate. According to yet another example variation of the present method, the temporary digital rights certificate comprises a time-limited digital rights certificate which expires after a prescribed period of time. According to yet another variation of the present method, the temporary digital rights certificate comprises an access-count limited digital rights certificate. An access-count limited digital rights certificate will only allow the neighbor node to access a received file a limited number of times. It should be further appreciated that, according to this variation of the present method, a neighbor node that receives a file and a temporary digital rights certificate may obtain a permanent digital rights certificate from a purchase manager. In this case, the purchase manager provides a permanent digital rights certificate once the purchase manager receives the provider identifier from the neighbor node that received the file promulgated according to the present method. The purchase manager then provides accounting to facilitate granting of an incentive for a distributor node that provided the file to the neighbor node.

Figure 5:
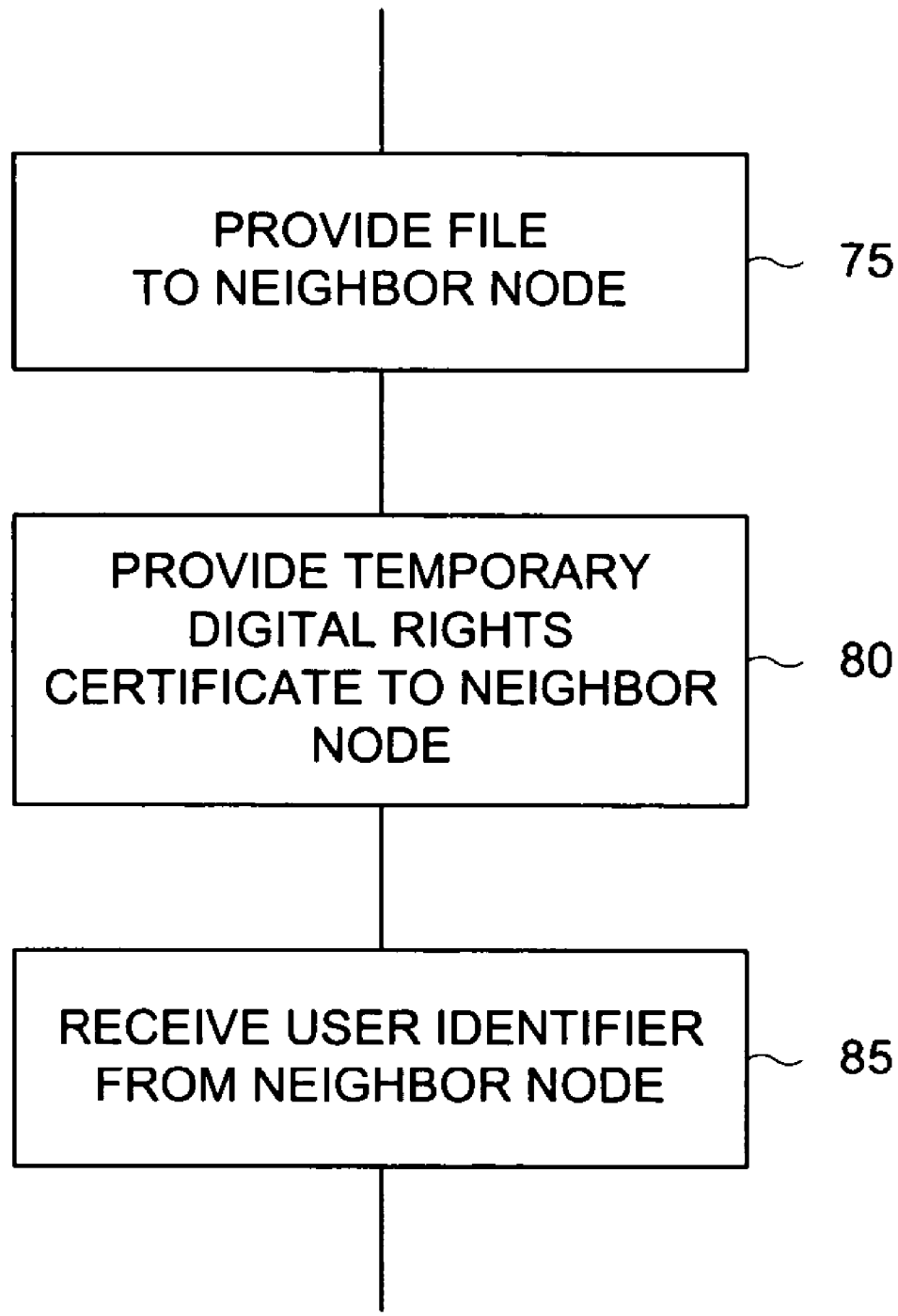
FIG. 5 is a flow diagram that depicts one alternative method for providing a file to a neighbor node wherein a user identifier may be used to claim an incentive.

FIG. 5 is a flow diagram that depicts one alternative method for providing a file to a neighbor node wherein a user identifier may be used to claim an incentive. According to this alternative example method, a file is provided to a neighbor node (step 75). A temporary digital rights certificate is also provided to the neighbor node (step 80). In this variation of the present method, a user identifier is received from the neighbor node (step 85). According to one illustrative use case, a provider node uses the user identifier received from a neighbor node (i.e. a node to which the file to be promulgated was provided) to claim an incentive. As such, a purchase manager can use the user identifier to determine if the neighbor node that received the file was an independent node according to the definition heretofore established. It should be appreciated that one variation of the present method provides that a temporary digital rights certificate be in the form of a time-limited digital rights certificate. Yet another variation of the present method provides for providing the neighbor node with an access-count limited temporary digital rights certificate.

Figure 6:
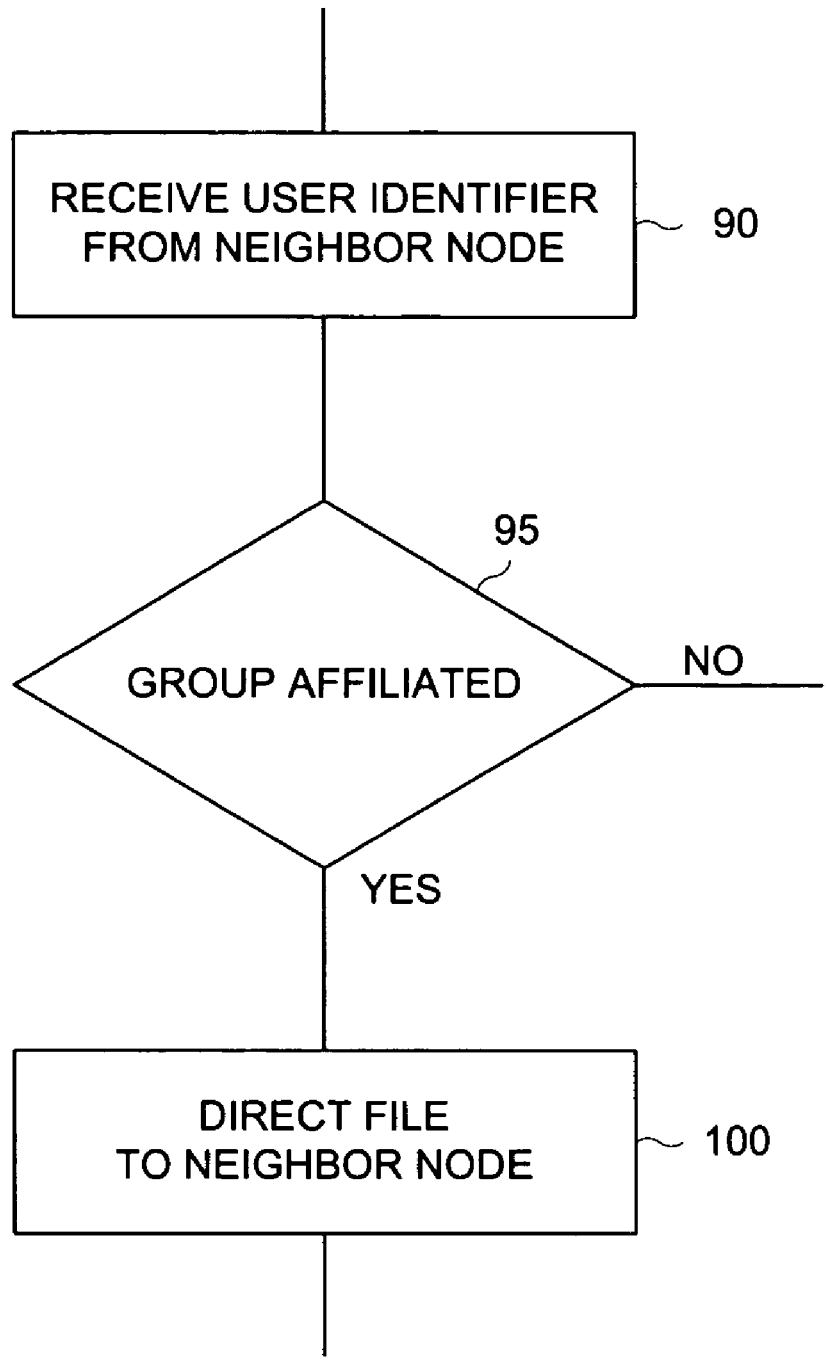
FIG. 6 is a flow diagram that depicts yet another example alternative method for providing a file to a neighbor noted that is affiliated with a particular group.

FIG. 6 is a flow diagram that depicts yet another example alternative method for providing a file to a neighbor node that is affiliated with a particular group. According to this example alternative method, a file is provided to a neighbor node by receiving a user identifier from the neighbor node (step 90). A determination is then made as to whether or not the user identifier received from the neighbor node corresponds to particular group (step 95). When the user identifier received from the neighbor node does correspond to a particular group, a file is then directed to the neighbor node (step 100). It should be appreciated that in a situation where a wireless electronic media file is widely distributed according to the present method, the electronic media file may only be meant for a particular group. According to one illustrative use case, the present method is used to provide files to group members, wherein the group members are constituents of a media club. A media club, as defined herein, comprises a group of individuals that subscribe to media promotions (e.g. a music club or a book-of-the-month club). This enumeration of media club types is not intended to limit the scope of the claims appended hereto.

Figure 7:
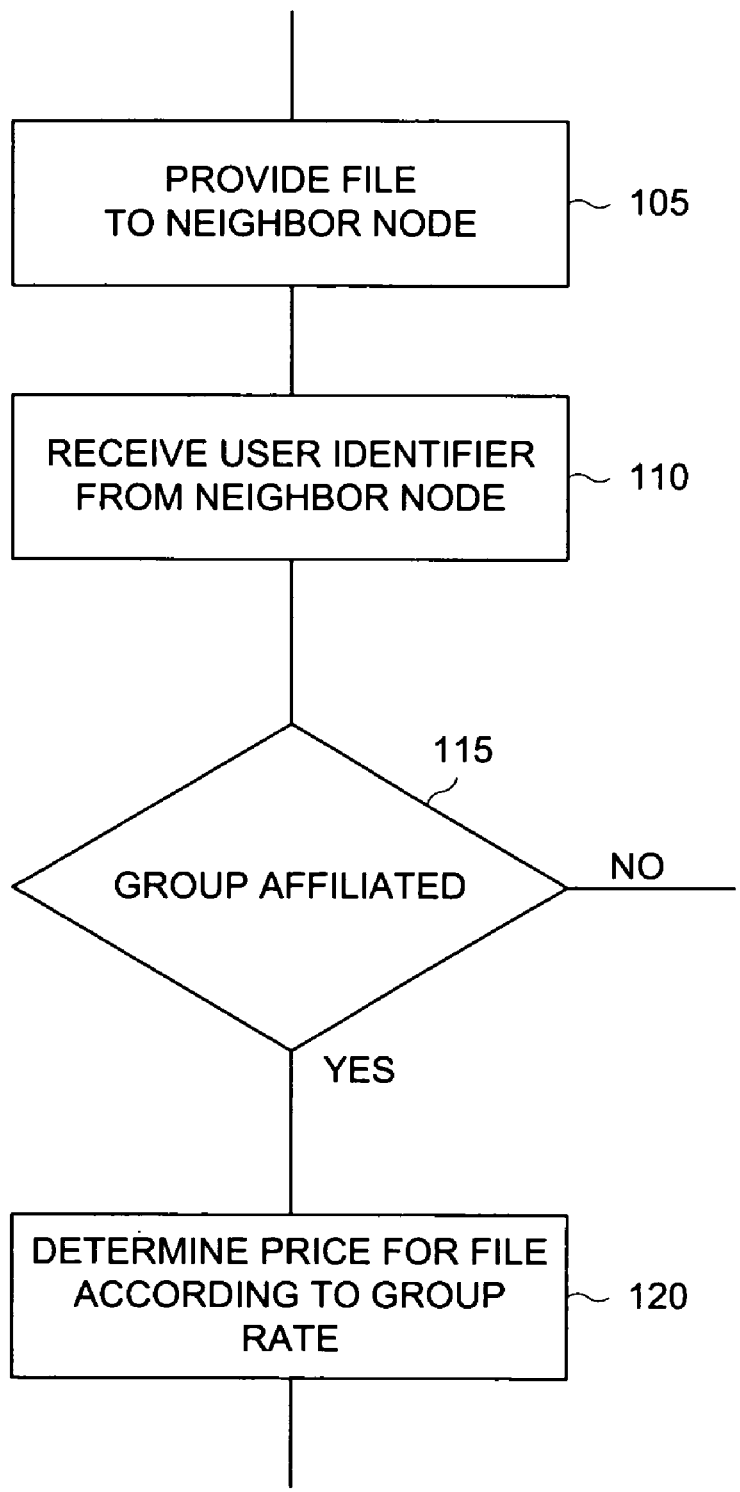
FIG. 7 is a flow diagram that depicts yet another alternative method for providing a file wherein a special price is provided for members of a particular group.

FIG. 7 is a flow diagram that depicts yet another alternative method for providing a file wherein a special price is provided for members of a particular group. According to this alternative example method, a file is provided to a neighbor node (step 105). A user identifier is then received from the neighbor node (step 110). A determination is made as to whether or not the user identifier received from the neighbor node is affiliated with a particular group (step 115). In the event that the user identifier received from the neighbor node is affiliated with a particular group, a price for the file is determined according to a group rate (step 120) for the particular group with which the user identifier is affiliated with. It should be appreciated that members of a particular group may be entitled to lower prices for a particular file. For example, as described above, a music club or a book-of-the-month club may be entitled to lower prices for media files, which can be affected according to this variation of the present method.

Figure 8:
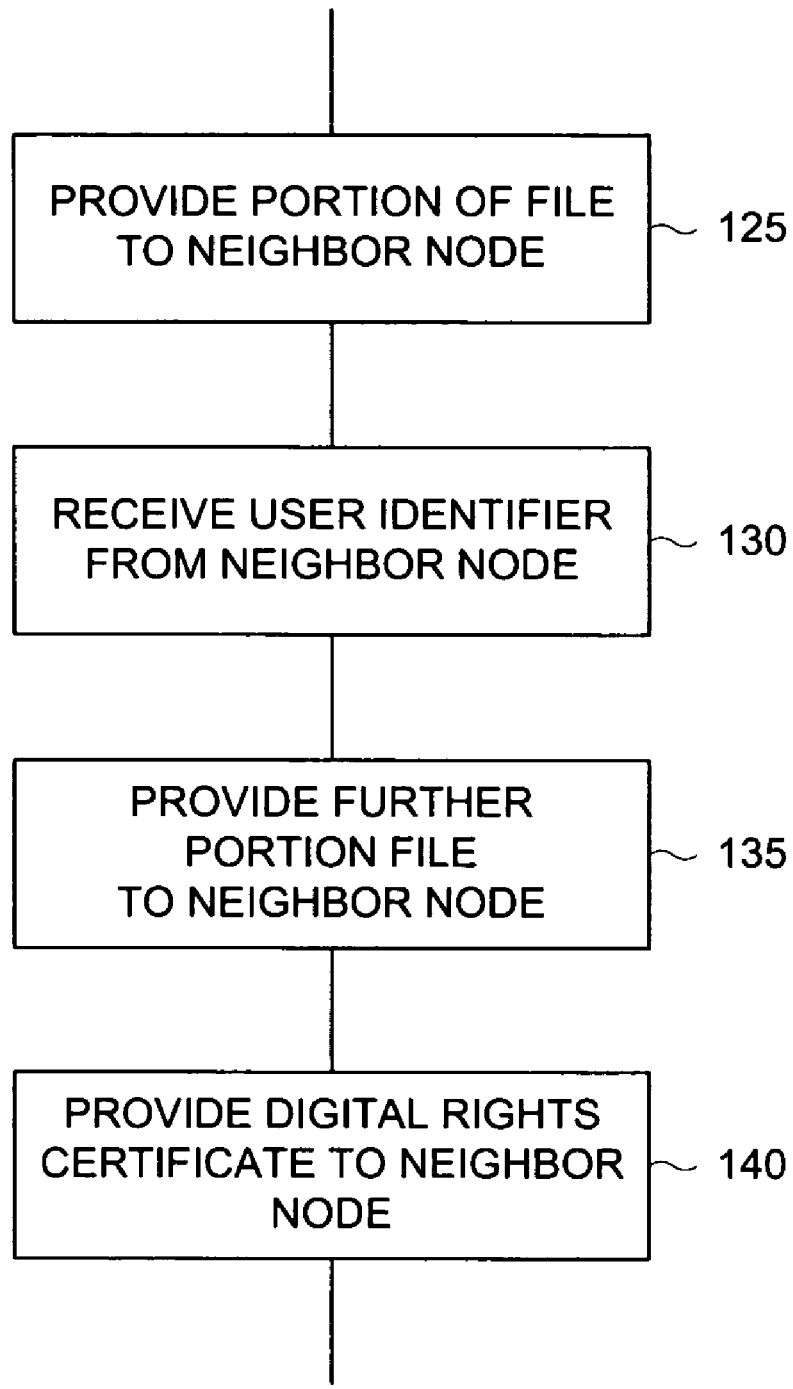
FIG. 8 is a flow diagram that depicts on alternative method for providing a file to a neighbor node wherein a preview is provided to the neighbor node.

FIG. 8 is a flow diagram that depicts on alternative method for providing a file to a neighbor node wherein a preview is provided to the neighbor node. According to this variation of the present method, a portion of a file is provided to a neighbor node (step 125). According to one illustrative use case, the neighbor node may present this initially provided portion of a file to a user. This initial presentation is generally referred to as a preview. Continuing with this illustrative use case, a user may decide to accept (i.e. purchase a particular file) once the user has been exposed to the preview. According to the illustrative use case described herein, once a user accepts a particular file, the neighbor node conveys a user identifier to the distributor node. In furtherance of this variation of the present method, a user identifier is then received from the neighbor node (step 130). Once the user identifier is received from the neighbor node, a further portion of the file is then conveyed to the neighbor node (step 135). A digital rights certificate is then optionally provided to the neighbor node (step 140).

Figure 9:
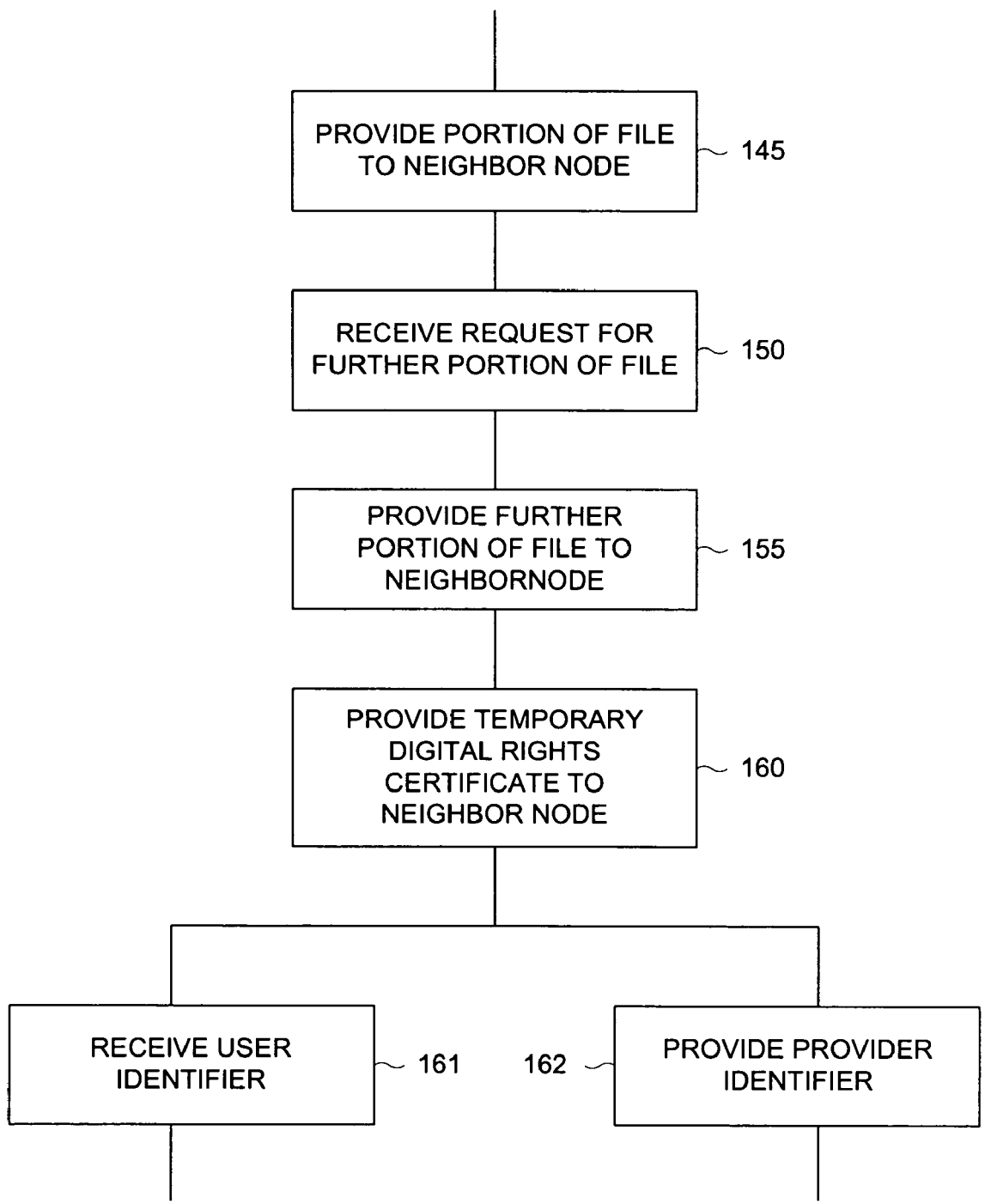
FIG. 9 is a flow diagram that depicts an alternative method for providing a file wherein a user is allowed to request a file after a preview is presented to the user of a neighbor node.

FIG. 9 is a flow diagram that depicts an alternative method for providing a file wherein a user is allowed to request a file after a preview is presented to the user of a neighbor node. According to this example variation of the present method, a portion of a file is presented to a neighbor node (step 145). In one illustrative use case, this initially provided portion of a file is presented to a user of a neighbor node as a preview of the file to be promulgated in accordance with the present method. In furtherance of this example variation of the present method, a request for a further portion of the file is then received (step 150) from the neighbor node. A further portion of the file is then conveyed to the neighbor node (step 155) in response to the received request. It should be appreciated that, according to this variation of the present method, a request for a further portion of the file need not necessarily include any type of identification of a user that is affiliated with the neighbor node that received the further portion of the file. As such, there is no means by which an incentive can be claimed or otherwise verified. Accordingly, a temporary digital rights certificate is conveyed to the neighbor node (step 160). The temporary digital rights certificate conveyed to the neighbor node comprises, according to one variation of the present method, a time-limited digital rights certificate. In yet another variation of the present method, the temporary digital rights certificate conveyed to the neighbor node comprises an access-limited digital rights certificate. The definitions of a time-limited digital rights certificate and an access-limited digital rights certificate have been presented supra.

In order to support a claim for an incentive, one variation of the present method provides for receiving a user identifier (step 161) from the node that received the file promulgated in accordance with the present method. Accordingly, a distributor node may use the user identifier to support a claim for incentive according to the present method. In yet another variation of the present method, a provider identifier is provided to the neighbor node (step 162). Accordingly, one illustrative use case provides that the distributor node claim an incentive. The claimed incentive, according to this illustrative use case, is validated by a purchase manager when a node that received the file obtains a permanent digital rights certificate. As such, the node that received the file provides to the purchase manager the provider identifier the neighbor node received along with the temporary digital rights certificate in order to obtain said permanent digital rights certificate.

Figure 10:
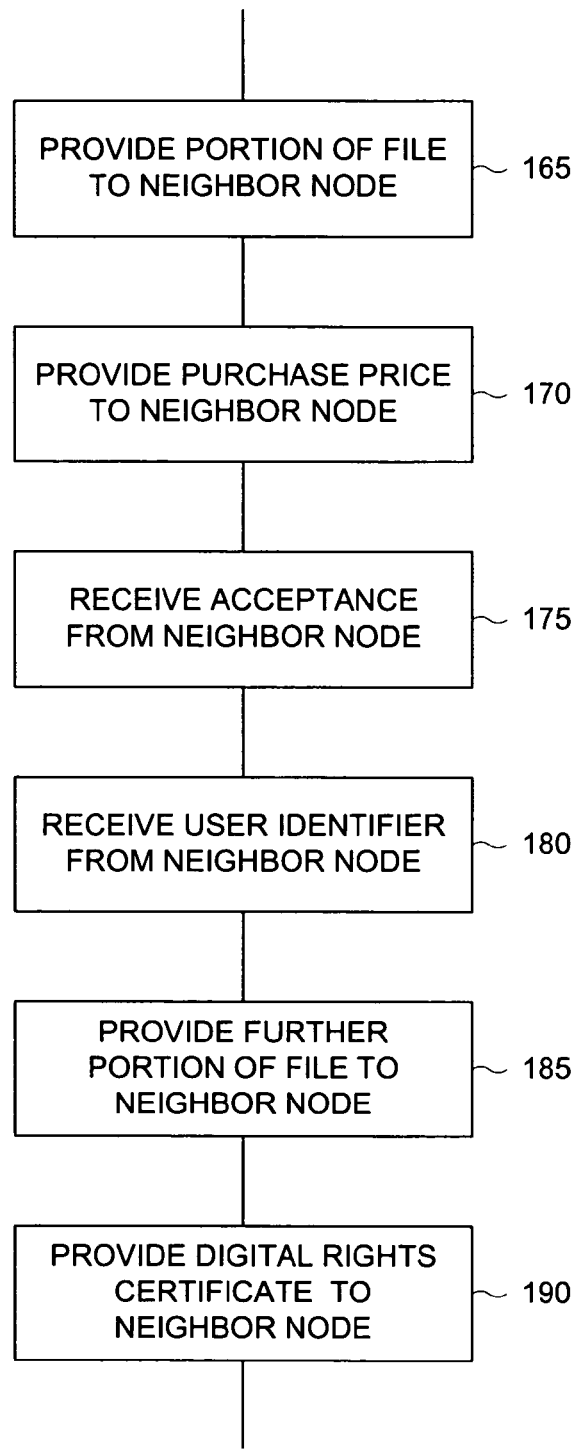
FIG. 10 is a flow diagram that depicts an alternative method for providing a file through an offer and acceptance process.

FIG. 10 is a flow diagram that depicts an alternative method for providing a file through an offer and acceptance process. According to this variation of the present method, a portion of a file is provided to a neighbor node (step 165). A purchase price is also provided to the neighbor node (step 170).

According to one illustrative use case, a neighbor node presents the initially received portion of the file to a user as a preview. The purchase price is also presented to the user of the neighbor node. In the event that the user of the neighbor node desires to purchase the file, the neighbor node conveys an acceptance to the distributor node. In furtherance of this variation of the present method, and acceptance is received from the neighbor node (step 175). Once the distributor node has received the acceptance, it further receives a user identifier from the neighbor node (step 180). A further portion of the file is then conveyed to the neighbor node (step 185). Given that a user identifier has been received from the neighbor node along with an acceptance of the purchase price, a digital rights certificate is provided to the neighbor node (step 190). It should be appreciated that providing a digital rights certificate to the neighbor node, according to one variation of the present method, is an optional step. It should also be appreciated that receiving an acceptance, according to one variation of the present method, comprises receiving a user identifier. As such receipt of a user identifier implies acceptance.

Figure 11:
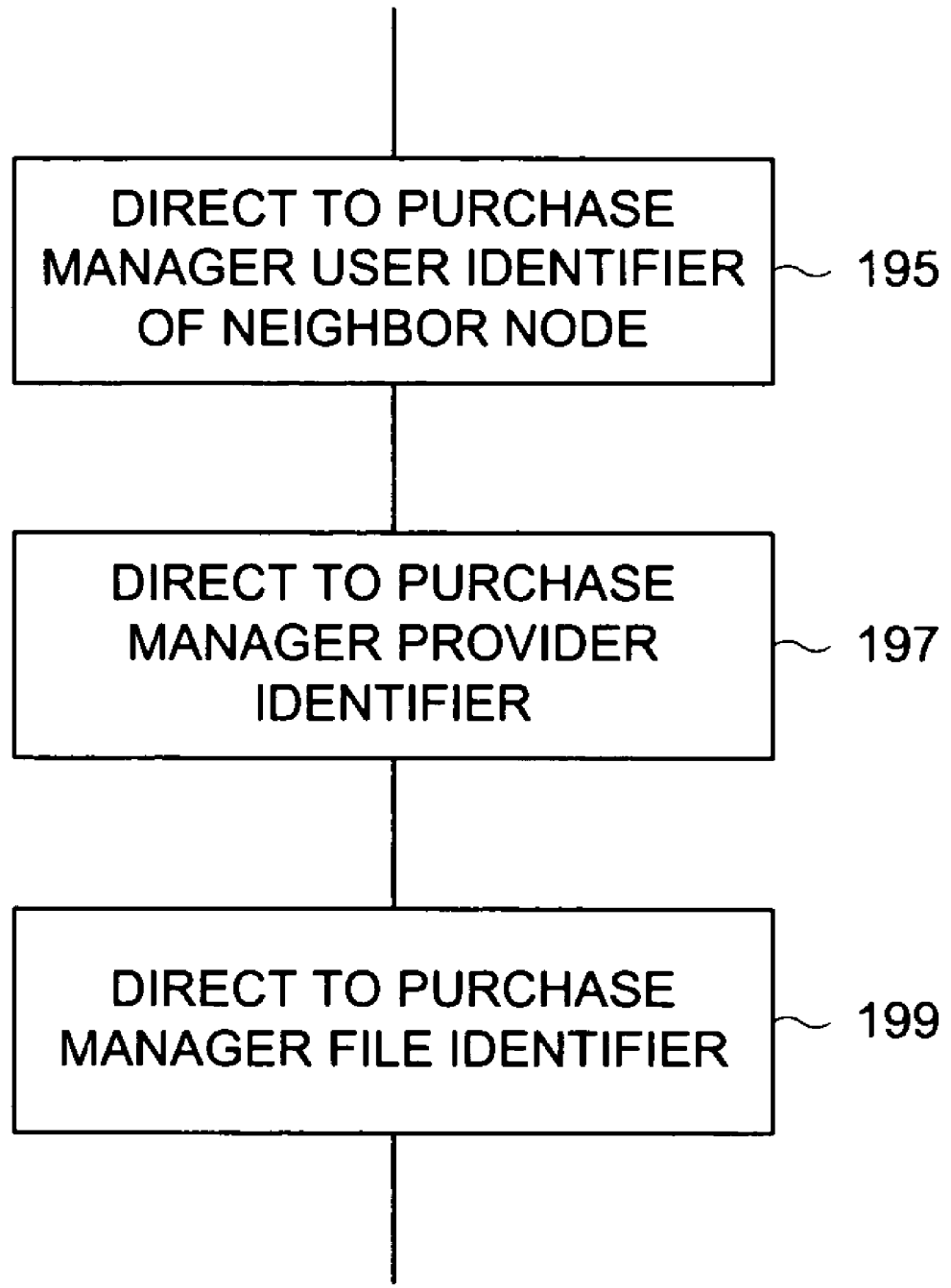
FIG. 11 is a flow diagram that it's what alternative example method for claiming an incentive.

FIG. 11 is a flow diagram that depicts an alternative example method for claiming an incentive. According to this alternative example method, a node that provides a file to a neighbor node claims an incentive by directing to a purchase manager a user identifier of a neighbor node that received a file promulgated according to the teachings of the present method. A provider identifier is also directed to the purchase manager (step 197). According to one illustrative use case, the purchase manager uses the provider identifier in order to provide an incentive to a user affiliated with a provider node (i.e. a distributor node) that provided a file to a neighbor node according to the teachings of the present method. According to yet another variation of the present method, a file identifier is also directed to the purchase manager (step 199). In this variation of the present method, the purchase manager uses the file identifier in order to determine a price of a file provided to a neighbor node. In yet another illustrative use case, the file identifier is used in conjunction with the user identifier and the provider identifier in order to properly account for an incentive for the user of a node that provided a file to a neighbor node.

Figure 12:
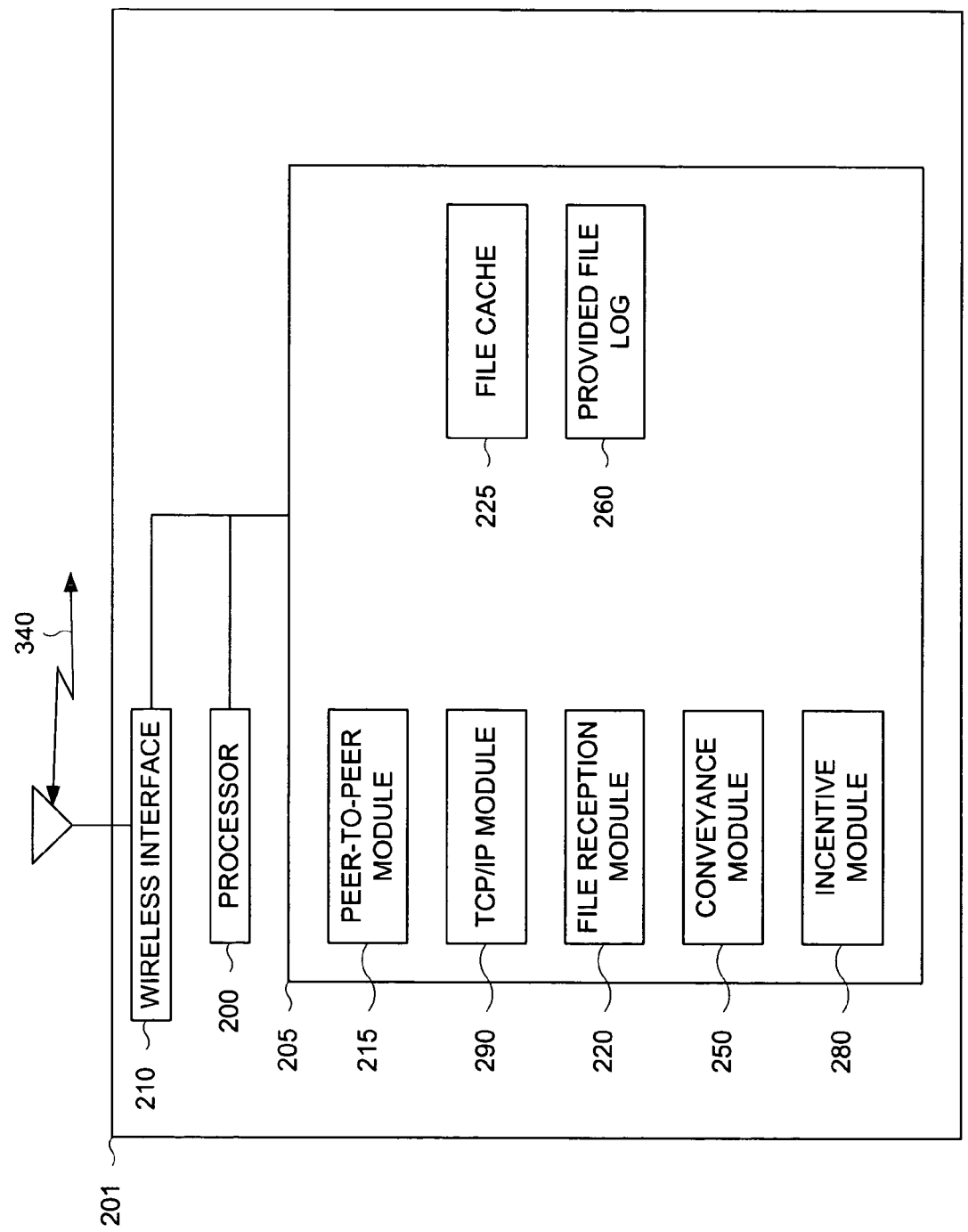
FIG. 12 is a block diagram that depicts several alternative example embodiments of a wireless file distribution device.

FIG. 12 is a block diagram that depicts several alternative example embodiments of a wireless file distribution device. According to one example embodiment, a wireless file distribution device 201 comprises a processor 200, a wireless interface 210 and a memory 205. These elements are communicatively associated with each other by means of a bus.

Various example embodiments of a wireless file distribution device 201 as heretofore described further include various functional modules each of which comprises an instruction sequence that can be executed by the processor 200. An instruction sequence that implements a functional module, according to one alternative embodiment, is stored in the memory 205. The reader is advised that the term "minimally causes the processor" and variants thereof is intended to serve as an open-ended enumeration of functions performed by the processor as it executes a particular functional module (i.e. instruction sequence). As such, an embodiment where a particular functional module causes a processor to perform functions in addition to those defined in the appended claims is to be included in the scope of the claims appended hereto.

The functional modules (and their corresponding instruction sequences) described thus far that enable wirelessly distributing a file are, according to one alternative embodiment, imparted onto computer readable medium. Examples of such medium include, but are not limited to, random access memory, read-only memory (ROM), Compact Disk (CD)

ROM, Digital Versatile Disk (DVD), floppy disks, hard disk drives and magnetic tape. This computer readable medium, which alone or in combination can constitute a stand-alone product, can be used to convert a general-purpose computing device into a device for wirelessly distributing files wherein said device is capable of distributing a file wirelessly according to the techniques and teachings presented herein. Accordingly, the claims appended hereto are to include such computer readable medium imparted with such instruction sequences that enable execution of the present method and all of the teachings herein described.

Stored in the memory 205 of this example embodiment are several functional modules including a peer-to-peer module 215, a file reception module 220, a conveyance module 250 and an incentive module 280. A portion of the memory 205 is used to store a file cache 225. A further portion of the memory 205 is used to store a provided file log 260. A Transport Control Protocol/Internet Protocol (TCP/IP) module 290 is also included in one alternative embodiment and is stored in the memory 205.

Figure 13:
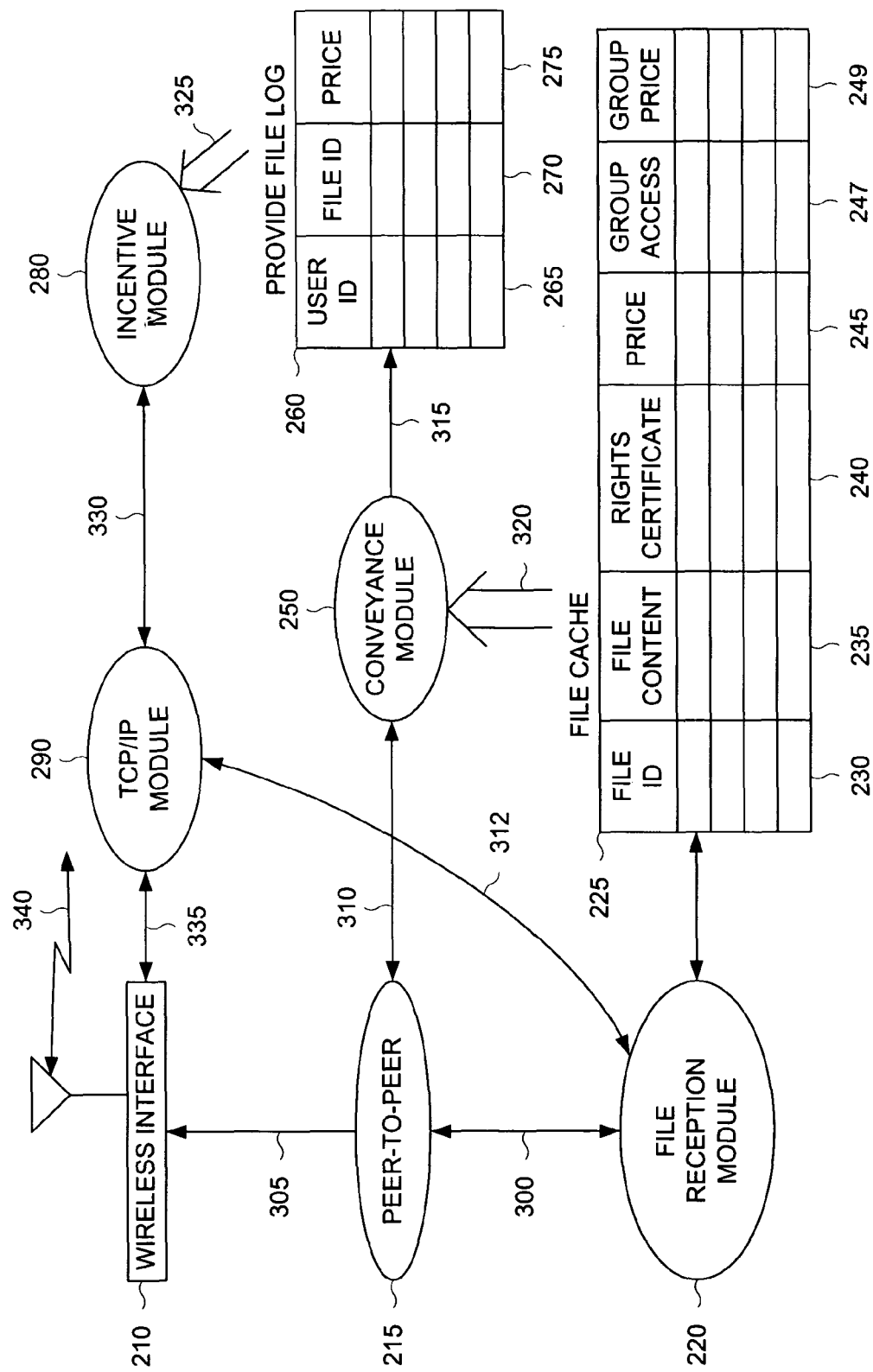
FIG. 13 is a data flow diagram that describes the internal operation of several alternative embodiments of a wireless file distribution device.

FIG. 13 is a data flow diagram that describes the internal operation of several alternative embodiments of a wireless file distribution device. In operation, the peer-to-peer module 215, when executed by the processor 200, minimally causes the processor to recognize a neighbor node. A neighbor node is recognized according to previously taught methods and techniques that the Applicant has described in the incorporated applications referenced above. Once a neighbor node has been recognized, the peer-to-peer module 215 further minimally causes the processor 200 to establish a communications connection 340 with the recognize neighbor node using the wireless interface 210. According to one illustrative use case, a first communications connection is established with a second wireless distribution device. The second wireless distribution device comprises at least one of a mobile wireless distribution device and a non-mobile wireless distribution device. As such, a wireless file distribution device can receive a file to be distributed (i.e. promulgated) from another wireless file distribution device of like type. In general, the second wireless file distribution device will take the form of a cellular telephone 5, a personal digital entertainment unit 15 and a personal digital assistant 10. It also be noted that the wireless file distribution device also includes a file source 27. A file source 27 typically comprises a larger scale device such as a file server that is operated by a distribution company for the purposes of promulgating media content files.

In the event that the peer-to-peer module 215 establishes a communications connection with a recognized neighbor node that comprises a second wireless file distribution device, the processor 200 executes the file reception module 220. When executed by the processor 200, the file reception module 220 minimally causes the processor to receive a file into the memory 205. According to one alternative embodiment, the file reception module 220 minimally causes the processor 200 to receive a file from a wireless file distribution device by means of a first communications connection 340 established by the processor 200 when it executes the peer-to-peer module 215. According to this example embodiment, the file is received into a file cache 225 stored in the memory 205.

Once a file is received into the file cache 225, the wireless file distribution device 201 is ready to promulgate the file. Accordingly, the processor 200 continues to execute the peer-to-peer module 215. The peer-to-peer module 215, when executed by the processor 200, further minimally causes the processor 200 to establish a second connection with a recognized neighbor node using the wireless interface 210. The processor 200 then executes the conveyance module 250. The conveyance module 250, when executed by the processor 200, minimally causes the processor 200 to convey to the second connection a portion of the file received into the memory 205. According to one example embodiment, the conveyance module 250 causes the processor 200 to retrieve 320 the content of a file from the file cache 225. As such, one example embodiment of a file cache 225 includes a file content field 235, which is used to store the content of a file received into memory. Typically, the file cache 225 is organized according to a file identifier field 230, thereby allowing the file cache to store a plurality of different files. According to yet another alternative embodiment, the file cache 225 further includes a digital rights certificate field 240 for each file stored therein. According to yet another alternative embodiment, the file cache 225 also includes a price field 245, which is used to store a price for each file stored therein.

As the processor 200 continues to execute the conveyance module 250, the conveyance module 250 further minimally causes the processor 200 to store 315 a file-provided record in the memory 205. Typically, the file-provided record is stored in the provided file log 260. According to this example embodiment, a file identifier for the provided file is stored in a file identifier field 270 included in one alternative embodiment of a provided file log 260. The processor 200 then executes the incentive module 280. The incentive module 280, when executed by the processor 200, minimally causes the processor 200 to generate an incentive request according to the file-provided record stored in the provided file log 260. The incentive module 280 then conveys the incentive request to a purchase manager 25 using the wireless interface 210. According to one alternative embodiment, the wireless file distribution device 201 includes a TCP/IP module 290 stored in the memory 205. In this alternative embodiment, the processor 200 executes the TCP/IP module 290 in order to establish a connection between the incentive module 280 and the purchase manager. The processor 200 then uses this connection to convey the incentive requests to the purchase manager 25.

According to one alternative embodiment, the conveyance module 250, when executed by the processor 200, causes the processor to provide a file to a recognized neighbor node by minimally causing the processor to convey a file identifier to the second connection, receive by way of the second connection an indicator reflecting the storage of the file in the neighbor node and convey to the second connection a portion of the file when the received indicator indicates that the neighbor node does not have stored therein the file associated with the file identifier. According to this example embodiment, the file cache 225 includes a file identifier field 230, which is used to store a file identifier for particular file received into the file cache 225 when the processor 200 executes the file reception module 220. The file identifier stored in the file identifier field 230 is conveyed to the second connection. According to one illustrative use case, a recognized neighbor node will use the file identifier to determine if that recognized neighbor node already has stored therein the file according to the file identifier it received from a wireless file distribution device. In the event that the recognize neighbor node does not have the file, the conveyance module 250 then retrieves 320 the content of the file from the file content field 235 included in this alternative embodiment of a file cache 225. The file content is then conveyed to the second connection thereby affecting the conveyance of the file to the recognize neighbor node.

According to yet another alternative embodiment, the file reception module 220 further minimally causes the processor 200 to receive into the memory 205 a temporary digital rights certificate for a particular file. The temporary digital rights certificate is then stored in the rights certificate field 240 included in a file cache 225 managed by this alternative embodiment of a wireless file distribution device. In this alternative embodiment, the conveyance module 250 causes the processor 200 to provide a file to a recognized neighbor node by minimally causing the processor 200 to retrieve file content from the file cache 225 and direct the file content to the second connection. At least a portion of the file is provided in this manner. The temporary digital rights certificate is retrieved 320 from the rights certificate field 240 of the file cache 225 and conveyed to the second connection. A provider identifier is also conveyed to the second connection. It should be appreciated that the provider identifier is typically stored in the memory 205. According to one illustrative use case, a recognized neighbor node will receive a portion of the file along with the provider identifier and the temporary digital rights certificate. Typically, a recognized neighbor node will need to acquire a permanent digital rights certificate. Typically, the recognized neighbor node will convey at least the provider identifier to a purchase manager in order to acquire a permanent digital rights certificate. The purchase manager can then use the provider identifier to provide an incentive to the user of a wireless file distribution device that provided the file to the recognize neighbor node according to the teachings of this alternative embodiment of a wireless file distribution device.

According to yet another alternative embodiment, the file reception module 220 further minimally causes the processor to receive into the memory 205 a temporary digital rights certificate for a particular file. The temporary digital rights certificate is then stored in the rights certificate field 240 included in a file cache 225 managed by this alternative embodiment of a wireless file distribution device. In this alternative embodiment, the conveyance module 250 causes the processor 200 to provide a file to a recognized neighbor node by minimally causing the processor 200 to retrieve 320 file content from the file cache 225 and direct the file content to the second connection. At least a portion of the file is provided in this manner. The temporary digital rights certificate is retrieved 320 from the rights certificate field 240 of the file cache 225 and conveyed to the second connection. According to this alternative embodiment, a user identifier is received from the recognized neighbor node by means of the second connection. The user identifier is stored in the memory 205. According to this alternative embodiment, the user identifier is stored in the provided file log 260, for example in a user identifier field 265 included in one alternative embodiment of a provided file log 260. According to one illustrative use case, a recognize neighbor node will receive a portion of the file along with the temporary digital rights certificate. Typically, a recognized neighbor node will need to acquire a permanent digital rights certificate. Typically, the recognized neighbor node will convey the temporary digital rights certificate to a purchase manager in order to acquire a permanent digital rights certificate. The wireless file distribution device can then use the user identifier in order to claim an incentive from a purchase manager 25. According to one illustrative use case, the purchase manager 25 will use the user identifier in order to validate an incentive request received from a wireless file distribution device.

According to yet another alternative embodiment, the conveyance module 250, when executed by the processor 200, causes the processor to provide a file by minimally causing the processor 200 to receive into the memory a user identifier by way of the second connection, which is established with a recognized neighbor node. This alternative embodiment of a conveyance module 250 then causes the processor 200 to determine if the user identifier is affiliated with a particular group. When the user identifier received by way of the second connection from a recognized neighbor node is affiliated with a particular group, then a portion of a file stored in the file cache 225 is conveyed to the second connection established by the processor 200 as it executes the peer-to-peer module 215. It should be appreciated that various embodiments of the present device will utilize various methods to determine when a user identifier is affiliated with a particular group. For example, a user identifier received from a recognized neighbor node may include a group identifier. The group identifier can then be used to determine which file stored in the file cache 225 is to be conveyed to the second connection. As such, various groups can be described, wherein each group may have different access to files stored in the file cache 225. For example, according to one alternative embodiment, the conveyance module 250 will retrieve 320 a group access identifier 247 from a group access identifier field 247 included in the file cache 225 and compare it with a group identifier extracted from a user identifier received from a recognized neighbor node by way of the second connection. According to yet another alternative embodiment, the conveyance module 250 further minimally causes the processor to establish a special sales price when the received user identifier is affiliated with a particular group. Accordingly, the file cache 245 of this alternative embodiment includes a group price field 249. In order to support a claim for an incentive, the conveyance module 250 causes the processor 200 to retrieve 320 a group price from the group price field 249 stored in the file cache 225. This is then stored along with the user identifier in the provided file log 260. As such, the user identifier is stored in the user identifier field 265 and the price is stored in a price field 275, both which are included in this alternative embodiment of a provided file log 260.

According to yet another alternative embodiment, the conveyance module 250 causes the processor to provide a file by minimally causing the processor to convey a first portion of the file to the second connection, which is established with a recognize neighbor node by the processor as it executes the peer-to-peer module 215. According to one illustrative use case, the recognize neighbor node can then request a further portion of the file. For example, a user of the recognize neighbor node can preview the file and indicate whether or not a further portion of the file should be requested. As such, one alternative embodiment of a conveyance module 250 provides for receiving a generic request for a further portion of the file when said conveyance module 250 is executed by the processor 200. According to yet another alternative embodiment, a neighbor node can request a further portion of the file by responding with a user identifier. In furtherance of promulgating the file, this alternative embodiment of a conveyance module 250 further minimally causes the processor to receive into the memory 205 a user identifier by way of the second connection. A further portion of the file is then conveyed to the second connection thereby affecting the transfer of the file to the recognize neighbor node. It should be appreciated that by receiving a user identifier, the user of a recognize neighbor node implicitly accepts the file. As such, a digital rights certificate is then conveyed to the second connection in order to provide the neighbor node with any digital rights certificate enabling access to the file. It should be appreciated that according to this alternative embodiment, the file reception module 220 further minimally causes the processor to receive a digital rights certificate, which is stored in the file cache 225 in the rights certificate field 240 for a particular file stored in the file cache 225. The digital rights certificate is received by means of the first communications connection, which is typically established with a second wireless distribution device (e.g. a file source 27).

According to yet another alternative embodiment, the conveyance model 250 causes a processor to provide a file by minimally causing the processor 200 to convey a first portion of the file to the second connection, which is established with a recognized neighbor node. In addition to the first portion of the file, the conveyance module 250 of this alternative embodiment further causes the processor 200 to convey a purchase price to second connection. According to this alternative embodiment, a purchase price is retrieved 320 from the file cache 225, for example from a price field 245 included in one alternative embodiment of the file cache 225. According to one illustrative use case, the user of a recognized neighbor node can preview the first portion of the file which is received by way of the second connection and consider the offer to purchase price. When the user accepts the purchase price, the recognized neighbor node can respond with a user identifier. Hence, the user identifier can be considered an implicit acceptance of the offer price to purchase the file promulgated in accordance with the teachings herein. Accordingly, this example embodiment of the conveyance module 250 further minimally causes the processor to receive a user identifier by way of the second connection. The user identifier is then stored 315 in the provided file log 260 in a user identifier field 265. The purchase price is also stored 315 in a price field 275 included in this alternative embodiment of the provided file log 260. The conveyance module 250 then retrieves 320 a further portion of the file from the file content field 235 included in the file cache 225 and conveys 310 the further portion of the file to the second connection, which is established by the processor with the recognized neighbor node as it executes the peer-to-peer module 215. Given the fact that a purchase has been affected, this alternative embodiment of the conveyance module 250 further causes the processor 200 to convey a digital rights certificate to the second connection. This is accomplished by retrieving a digital rights certificate from the rights certificate field 240 included in the file cache 225.

According to yet another alternative embodiment, the incentive module 280 causes the processor to generate an incentive request by minimally causing the processor to store in the memory 205 a user identifier received from a neighbor node by means of the second connection, which is typically established with a recognize neighbor node by the processor 200 as it executes the peer-to-peer module 215. A provider identifier is also stored in association with the user identifier. Typically, the incentive module 280 retrieves 325 a record from the provided file log 260. The record retrieved 325 includes a user identifier and a file identifier. According to yet another alternative embodiment, the retrieved record 325 further includes a price. When conveyed to a purchase manager, the incentive request facilitates granting of an incentive to a user that controls a particular wireless file distribution device. It should be appreciated that the provider identifier, according to various alternative embodiments, comprises at least one of a distributor account number, a name, a telephone number, and a cellular telephone number. It should be appreciated these are merely examples of various types of provider identifiers that can be utilized in accordance with the teachings of the present method. Accordingly, the claims appended hereto are not intended to be limited to any of the examples presented herein.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

The invention claimed is:

1. A method for the promotion and sale of media files over ad-hoc mobile device networks, the method comprising:
    accessing, at a first mobile device, a file to promulgate;
    recognizing a second mobile device;
    establishing an ad-hoc network connecting the first mobile device with the second mobile device;
    receiving a user identifier from the second mobile device;
    conveying a file identification field associated with the file to the second mobile device;
    receiving a parameter from the second mobile device indicating whether the file is already stored in the second mobile device;
    conveying at least a first portion of the file and a preview digital rights certificate to the second mobile device when the user identifier indicates membership in a media club and the received parameter indicates that the file corresponding to the file identification field is not stored in the recognized second mobile device;
    conveying a purchase price associated with the file to the second mobile device;
    receiving a purchase request for the file from the second mobile device; and
    establishing a connection with a distributing source, the distributing source conveying to the second mobile device (i) a purchase digital rights certificate associated with the file upon confirmation of the second mobile device purchasing the file, and (ii) a second portion of the file upon confirmation of the second mobile device purchasing the file, wherein the second portion comprises the remainder of the purchased file having media content distinct from media content in the first portion of the file and yet to be conveyed to the second mobile device.

2. The method of claim 1, wherein conveying a purchase price comprises:
    conveying a purchase price that reflects a group rate for the media club.

3. The method of claim 1, wherein the conveying at least a first portion of the file comprises:
    conveying a further portion of the file to the second mobile device, wherein the further portion includes media content distinct from media content in the first portion of the file and yet to be conveyed to the second mobile device; and
    conveying an updated temporary digital rights certificate associated with the further portion of the file to the second mobile device.

4. The method of claim 1 wherein the conveying at least a first portion of the file comprises:
    receiving from the second mobile device a request for a further portion of the file;
    conveying a further portion of the file to the second mobile device, wherein the further portion includes media content distinct from media content in the first portion of the file and yet to be conveyed to the second mobile device; and
    conveying an updated temporary digital rights certificate associated with the further portion of the file to the second mobile device.

5. The method of claim 1, comprising:
conveying, from the first mobile device, a provider identifier to the second mobile device;
conveying, from the second mobile device, the provider identifier to the distributing source; and
conveying, from the distributing source, an incentive to a person identified by the provider identifier upon confirmation of the second mobile device purchasing the file.

6. A wireless file distribution system for the promotion and sale of media files over ad-hoc mobile device networks, the system comprising:
a first mobile device comprising:
a processor capable of executing an instruction sequence;
a wireless interface capable of interacting with a wireless network enabling peer-to-peer connections amongst a plurality of mobile devices;
a memory capable of storing a file cache and one or more instruction sequences including:
a peer-to-peer module that, when executed by the processor, minimally causes the processor to:
recognize a neighbor mobile device from a plurality of mobile devices; and
establish a first connection with a distributing source and a second connection with a recognized neighbor mobile device using the wireless interface;
a file reception module that, when executed by the processor, minimally causes the processor to receive a file into the memory by means of a first communications connection;
a conveyance module that, when executed by the processor, minimally causes the processor to:
receive into the memory a user identifier by way of the second connection;
convey from the file cache to the second connection a file identification field associated with the file;
receive from the second connection a parameter indicating whether the file is already stored in the recognized neighbor mobile device;
convey to the second connection at least a first portion of the file received into the memory and a preview digital rights certificate when the received user identifier indicates membership in a media club and the received parameter indicates that the file corresponding to the file identification field is not stored in the recognized neighbor mobile device;
create a file-provided record in the memory that reflects the conveyance of the at least a first portion of the file to the second connection; and
convey to the second connection a purchase price associated with the file; and
a distributing source comprising a distributing processor capable of executing an instruction sequence, wherein detection of a purchase request for the file from the recognized neighbor mobile device causes the distributing processor to convey to the recognized neighbor mobile device (i) a purchase digital rights certificate associated with the file upon confirmation of the recognized neighbor mobile device purchasing the file, and (ii) a second portion of the file upon confirmation of the recognized neighbor mobile device purchasing the file, wherein the second portion comprises the remainder of the purchased file having media content distinct from media content in the first portion of the file and yet to be conveyed to the recognized neighbor mobile device.

7. The wireless file distribution system of claim 6, comprising:
an incentive module that, when executed by the processor, minimally causes the processor to:
generate an incentive request according to the file-provided record stored in the memory; and
convey the incentive request to the distributing source using the wireless interface.

8. The wireless file distribution system of claim 6, wherein the file reception module minimally causes the processor to receive into the memory by way of the first connection the preview digital rights certificate and wherein the conveyance module causes the processor to convey the at least a first portion of the file by minimally causing the processor to:
convey from the memory to the second connection the preview digital rights certificate; and
convey to the second connection a provider identifier.

9. The wireless file distribution system of claim 6, wherein the file reception module minimally causes the processor to receive into the memory by way of the first connection the preview digital rights certificate and wherein the conveyance module causes the processor to convey the at least a first portion of the file by minimally causing the processor to:
convey from the memory to the second connection the preview digital rights certificate; and
receive into the memory a user identifier by way of the second connection.

10. The wireless file distribution system of claim 6, wherein the conveyance module causes the processor to convey the at least a first portion of the file by minimally causing the processor to:
determine a price based on a membership rate when the received user identifier indicates membership in the media club.

11. The wireless file distribution system of claim 6, wherein the file reception module minimally causes the processor to receive into the memory by way of the first connection the purchase digital rights certificate and wherein the conveyance module causes the processor to convey the at least a first portion of the file by minimally causing the processor to:
convey from the memory to the second connection a first portion of the file;
convey from the memory to the second connection a further portion of the file, the further portion having media content distinct from media content in the first portion of the file and yet to be conveyed to the second connection; and
convey from the memory to the second connection the purchase digital rights certificate.

12. The wireless file distribution system of claim 6, wherein the file reception module minimally causes the processor to receive into the memory by way of the first connection the preview digital rights certificate and wherein the conveyance module causes the processor to convey the at least a first portion of the file by minimally causing the processor to:
convey from the memory to the second connection a first portion of the file;
receive by way of the second connection a request for a further portion of the file;
convey from the memory to the second connection the further portion of the file, the further portion having media content distinct from media content in the first portion of the file and yet to be conveyed to the second connection; and convey from the memory to the second connection the preview digital rights certificate.

13. The wireless file distribution system of claim 6, wherein the file reception module further minimally causes the processor to receive into the memory by way of the first connection the purchase digital rights certificate and wherein the conveyance module causes the processor to convey the at least a first portion of the file by minimally causing the processor to:
   convey from the memory to the second connection a first portion of the file;
   convey from the memory to the second connection a purchase price;
   convey from the memory to the second connection a further portion of the file, the further portion having media content distinct from media content in the first portion of the file and yet to be conveyed to the second connection; and
   convey from the memory to the second connection the purchase digital rights certificate.

14. The wireless file distribution system of claim 7, wherein the incentive module causes the processor to generate an incentive request by minimally causing the processor to:
   store in the memory the user identifier received by means of the second connection; and
   store in the memory a provider identifier, wherein the provider identifier is stored in association with the user identifier.

15. The wireless file distribution system of claim 7, wherein the incentive module causes the processor to generate an incentive request by minimally causing the processor to store a file identifier in association with the user identifier.

16. The method of claim 1, wherein conveying the preview digital rights certificate comprises:
   conveying a preview digital rights certificate to limit access rights to the at least a first portion of the file.

17. The method of claim 1, wherein conveying the preview digital rights certificate comprises:
   conveying a preview digital rights certificate to limit a period of time for accessing the at least a first portion of the file.

18. The method of claim 1, wherein conveying the preview digital rights certificate comprises:
   conveying a preview digital rights certificate to include a play count for limiting a quantity of times for accessing the at least a first portion of the file.

\* \* \* \* \*